April 25, 1967  D. R. DAYTON ETAL  3,316,398
VARIABLE SPOT MECHANISM

Filed Sept. 29, 1964  3 Sheets-Sheet 1

DAVID R. DAYTON
ALBERT H. NIMBLETT JR.
JULIAN J. WIERZBICKI
*INVENTORS*

BY *Lawrence Burns*
ATTORNEY

April 25, 1967

D. R. DAYTON ETAL 3,316,398

VARIABLE SPOT MECHANISM

Filed Sept. 29, 1964

DAVID R. DAYTON
ALBERT H. NIMBLETT JR.
JULIAN J. WIERZBICKI
*INVENTORS*

BY *Lawrence Burns*

ATTORNEY

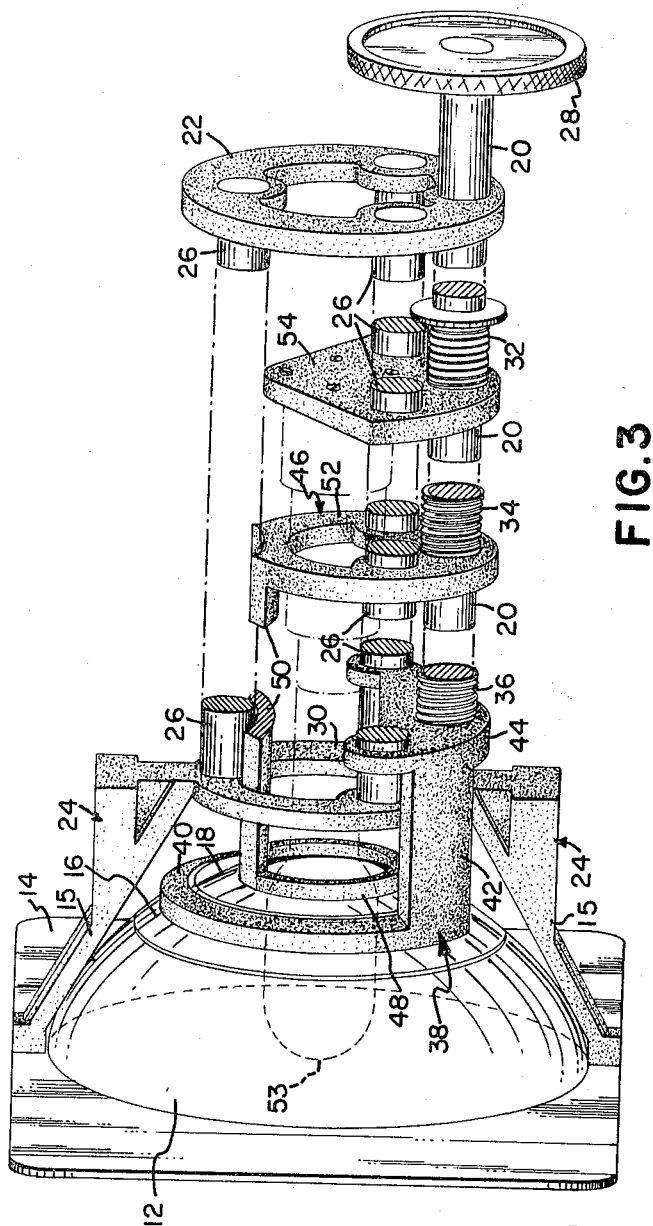

United States Patent Office 3,316,398
Patented Apr. 25, 1967

3,316,398
VARIABLE SPOT MECHANISM
David R. Dayton, Beverly, Albert H. Nimblett, Jr., Salem, and Julian J. Wierzbicki, Peabody, Mass., assignors to Sylvania Electric Products Inc., a corporation of Delaware
Filed Sept. 29, 1964, Ser. No. 400,270
6 Claims. (Cl. 240—44)

This invention relates to photographic lighting devices and more particularly to an adjustable mechanism for a variable lighting unit that can be used in the field of photography or similar endeavors.

Present lighting equipment used in conjunction with motion picture photography, theatrical-television presentations and other related activities, operate on a myriad of principles. Some of which are: advancing a light source with respect to a fixed reflector, moving a lamp or lens with respect to each other, or expanding or contracting a leaf-type reflector with respect to a fixed lamp. The main objective of these systems is to produce true optical variable light patterns.

These devices have many combined mechanical and optical disadvantages. For example, they have a limited beam control and high efficiency is difficult to obtain, principally because the mechanism used to establish the desired contours of the reflector systems is very cumbersome and complex.

We have discovered that a unit will fulfill the desired optical requirements, which are essential for photographic lighting can be made by cutting a reflector perpendicularly to its axis of revolution so that the resultant reflector is formed of three annular rings or segments which form a nearliy paraboloidal reflector. Combined with a light source that is adjustable to a different distance with respect to each reflector element, the beam can be kept uniform over a large angular spread range. The outer ring or reflector segment is fixed and the other two reflector segments and the light source move with respect to it.

The inner movable reflector segment forming the vertex section, is provided with an aperture for the entrance of the light source. Another segment of the reflector comprises a fixed outer or enlarged section of the reflector, that is provided with a flat frontal face plate for the purpose of securing this segment to the housing or casing of the unit. A third central segment is also movable and is located between the inner movable and the outer fixed annular reflector segments. The combination of the three annular reflector segments when abutting one another will form a substantially paraboloidal reflector and having true optical quality.

Relative movement of the three components, the inner reflector ring, the central reflector ring, and the light source, will produce efficient light patterns of varied shapes for different points on the reflector. Such movement can introduce additional degrees of freedom over the older forms of variable beam units. The contour of each reflector section of our unit is designed to produce a given light beam pattern for specific alignment. The degree of movement of each element of the system will vary the light beam in a predetermined manner.

As mentioned above, the inner annular reflector segment, the central annular reflector segment and the light source can be positively positioned relative to each other and the fixed outer annular segment. The rate of travel of the movable components will vary, to provide the desired optical performance of the unit. The movement of each of the components, the inner segment, the central segment and the light source are controlled by a common gear shaft, which has a series of worm gears integral therewith. The worm gears are varied, that is they have different number of threads per inch (t.p.i.) thereby rotation of the gear shaft and the diverse worm gears will be utilized to move the components in varying degrees.

In view of the foregoing, one of the principal objects of this invention is to provide a variable lighting unit having a split reflector and a light source that is adjustably disposed to establish a multiplicity of light patterns.

Another object of this invention is to provide a mechanical means whereby the different reflector components and the light source can be displaced in a desired ratio to maintain the reflector and the lamp in an optical relationship.

These and other objects, features and advantages of the invention will become apparent from the following specification, when taken in connection with the accompanying drawings in which:

FIGURE 3 is an exploded perspective view of the mechanism showing in detail the relationship between the different components.

Figure 1:
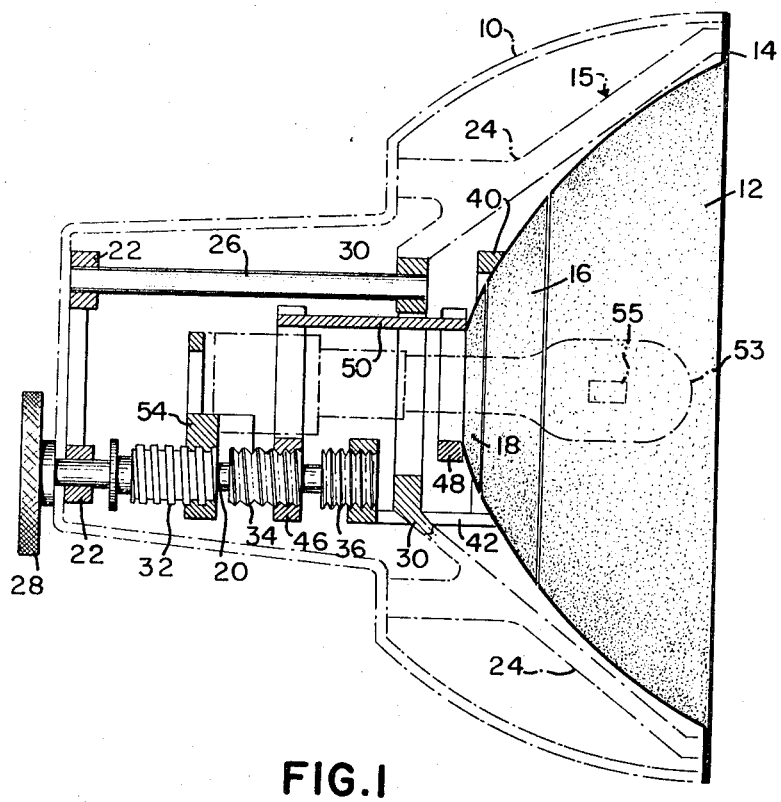
FIGURE 1 is an elevational cross-section of the adjustable lighting unit in its closed or spot position, showing in particular the gearing and associated support members.

Referring now to FIG. 1, the lighting unit of this invention comprises a suitable housing or casing 10 (shown in phantom lines, so as not to detract from the instant invention). A main outer reflector 12, having a flat frontal plate 14, the plate is fastened to a series of braces 15 of a housing frame 24 thereby firmly securing the main outer reflector segment to the housing. The remaining rear portion of the reflector is vertically split into two segments 16 and 18 respectively, and when abutting one another they form a reflector shape similar to a parabola having specified optical requirements. Positioned to the rear of the split reflector components 16 and 18 is a gear shaft 20, that is supported by a bearing plate 22 and extends rearwardly through the casing 10, the distal end of which is provided with a control handle 23 for operation of said gear shaft 20.

Located between the rear bearing plate 22 and the reflector segments are a series of support shafts 26 (more clearly seen in FIG. 3). These shafts 26 have a dual purpose in that they space the housing frame from the rear bearing plate 22, to provide adequate space for additional operational mechanism (which will be described hereinafter), also the lower two shafts 26 support and guide the gear components which will be described hereinafter.

Figure 2:
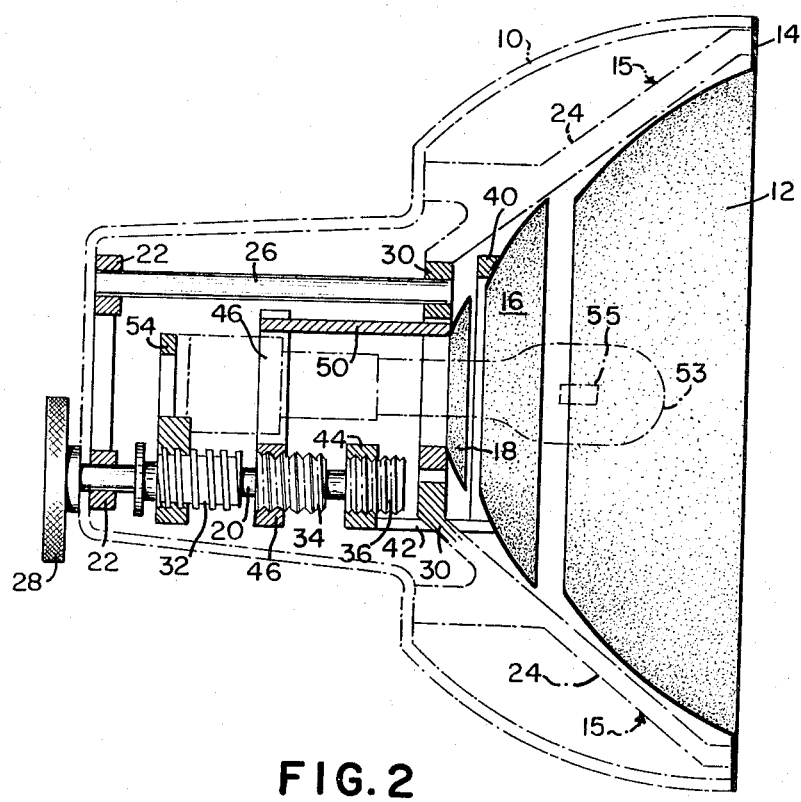
FIGURE 2 is an elevational cross-section such as shown in FIGURE 1 but with the split reflector and the light source moved to its related open or flood position of the unit.

Referring now to FIG. 2, as mentioned above, the outer reflector is secured to the housing frame 24. The frame 24 comprises two legs 15 which extend rearwardly and converge at, and are a part of, a circular bearing ring 30. As mentioned above, the space provided between the front bearing ring 30 and the rear bearing ring 22 is utilized for the positioning mechanism that will now be described.

The gear shaft 20 which is supported by the rear bearing ring 22, extends to the front of the unit and is provided with three varied worm gears 32, 34, and 36 that are fixedly supported intermediate the length of the shaft.

Worm gear 36 is positioned at the forward end of the shaft 20 and is mated into corresponding internal threads of a crescent-shaped rear plate 44 of the central reflector positioner 38 which has the central reflector segment 16 attached thereto.

Likewise the worm gears 32 and 34 will perform similar to the gear 36 in that the gear 34 also mates with the internal threads of a ring portion 52 of reflector positioner 46.

A curved spacing sector 50 joins the ring portion 52 to a forward fastening ring 48, the purpose of which is to retain the inner reflector 18 in optical relationship with the other reflector segments. As mentioned above gear 34 fixed to gear shaft 20 mates with internal threads in the ring portion 52, thus when the shaft 20 is rotated the ring portion 52 and the forward fastening ring 48 holding the inner reflector 18 will be incrementally adjusted.

The third movable component is the light source which is also adjustable relative to the reflector segments. For a light source we prefer to use a single-ended high intensity lamp such as an iodine quartz lamp which is relatively small and has high optical efficiency.

In the drawings, the lamp 53 (shown in phantom lines for clarity of the drawings) is fixed to a lamp support plate 54. This lamp arrangement will also function similar to the other movable members in that the support plate 54 will be adjusted relative to the fixed reflector 12 and the adjacent reflector segments 16 and 18. This is accomplished, as mentioned above, by the rotation of the gear shaft 20 and the worm gear 32 associated therewith. The worm gear 32 having a different t.p.i. than the other gears will mate with internal threads in the lamp support plate 54, therefore, adjusting the lamp 53 a predetermined distance relative to the other members of the unit.

Reference will now be made to FIG. 1. In this view of the drawing the gear shaft 20 has been rotated to a position that has located the movable elements, such as the lamp 53, the central reflector segment 16 and the inner reflector segment 18 in a cloesd or spot position. This articular position of the related parts of the unit places the filament of the lamp 55 at the desired focal location relative to the contour of the formed reflector shape and the reflector segments which are now in abutting relationship.

As seen in FIG. 2 the gear shaft 20 has been rotated opposite to that in FIG. 1. This will position lamp 53, reflector segments 16 and 18 to a new location, one that is considered an open or flood position. The relative position of the lamp 54 and the movable reflector segments 16 and 18 can readily be seen, in that the filament 55 of the lamp 53 is now located at a new focal point with respect to the newly formed reflector shape. This new position as stated above will produce a light pattern of a "flood" or spread pattern.

It is apparent the modifications and changes may be made by those skilled in the art, but it is our intention, however, only to be limited by; the scope of the instant invention.

What we claim is:

1. A lighting fixture comprising: a substantially parabolic reflector, said reflector being cut substantially perpendicular to the axis of revolution thereof to define a plurality of segments, said segments being movable with respect to one another; a light source normally disposed at the focal point of said reflector; means for displacing said light source axially in said parabolic reflector; means for displacing said movable segments of said reflector with respect to one another, the displacement of said light source and the displacement of said movable segments being effected in a co-operative relationship with respect to one another whereby a substantially uniform beam over a large angular spread range is obtained.

2. A lighting gxture comprising: a substantially parabolic reflector, said reflector being cut substantially perpendicular to the axis of revolution thereof to define a plurality of segments, one of said segments being fixed and the others being movable with respect to said fixed segment and with respect to one another; a light source normally disposed at the focal point of said reflector; means for displacing said light source axially in said parabolic reflector; means for displacing said movable segments of said reflector with respect to one another and with respect to said fixed segment, the displacement of said light source and the displacement of said movable segments being effected in a co-operative relationship with respect to one another whereby a substantial uniform beam over a large angular spread range is obtained.

3. A lighting fixture comprising: a substantially parabolic reflector, said reflector being cut substantially perpendicular to the axis of revolution thereof to define a plurality of segments, one of said segments being fixed and the others being movable with respect to said fixed segment and with respect to one another; a light source normally disposed at the focal point of said reflector; means for displacing said light source axially in said parabolic reflector; means for displacing said movable segments of said reflector with respect to one another and with respect to said fixed segment, said means for displacing said reflector segments comprising a gear shaft having a plurality of gears of varied pitch attached thereto, said gears being in cooperative relationship with said segments, thereby upon rotation of said gear shaft and said gears of varied pitch the said movable segments will be displaced so as to produce a substantially uniform beam over a large angular spread range.

4. A lighting fixture comprising: a substantially parabolic reflector, said reflector being cut substantially perpendicular to the axis of revolution thereof to define a plurality of segments, one of said segments being fixed and the others being movable with respect to said fixed segment and with respect to one another; a light source normally disposed at the focal point of said reflector; means for displacing said light source and said reflector segments with respect to one another and with respect to said fixed segment, said displacing means comprising a common gear shaft having a plurality of gears of varied pitch attached thereto, each of said varied pitched gears mating with a cooperating internal thread associated with each of the movable segments and the light source, thereby providing for rotation of said gear shaft and said varied pitched gears so that the said light source and said movable reflector segments will be incrementally displaced so as to produce a substantially uniform beam over a large angular spread range.

5. A lighting fixture comprising: a substantially parabolic reflector, said reflector being cut substantially perpendicular to the axis of revolution thereof to define a plurality of segments, one of said segments being fixed and the others being movable with respect to said fixed segment and with respect to one another; a light source normally disposed at the focal point of said reflector; and means for displacing said light source and said reflector segments with respect to one another and with respect to fixed segment at a predetermined ratio so as to produce a substantially uniform beam over a large angular spread range.

6. A lighting fixture comprising: a substantially parabolic reflector, said reflector being cut substantially perpendicular to the axis of revolution thereof to define a plurality of segments, one of said segments being fixed and the others being movable with respect to said fixed segment and with respect to one another; a light source normally disposed at the focal point of said reflector; means for displacing said light source and said reflector segments in varying increments with respect to one another and with respect to said fixed segment, so as to displace said light source and said movable reflector segments at different ratios and thus produce a substantially uniform beam over a large angular spread range.

(References on following page)

References Cited by the Examiner

UNITED STATES PATENTS 1,148,942  9/1915  Wilson _____ 240—44
1,286,269  12/1918  Foley _____ 240—44
2,293,941  8/1942  Keefe _____ 240—44.2

FOREIGN PATENTS 26,616  4/1884  Germany.

NORTON ANSHER, *Primary Examiner.*
C. C. LOGAN, *Assistant Examiner.*